Feb. 15, 1949. R. SIMPSON 2,461,930
EXPOSURE METER HAVING COORDINATED METER
POINTER AND CALCULATING DISK
Filed April 26, 1946 4 Sheets-Sheet 2
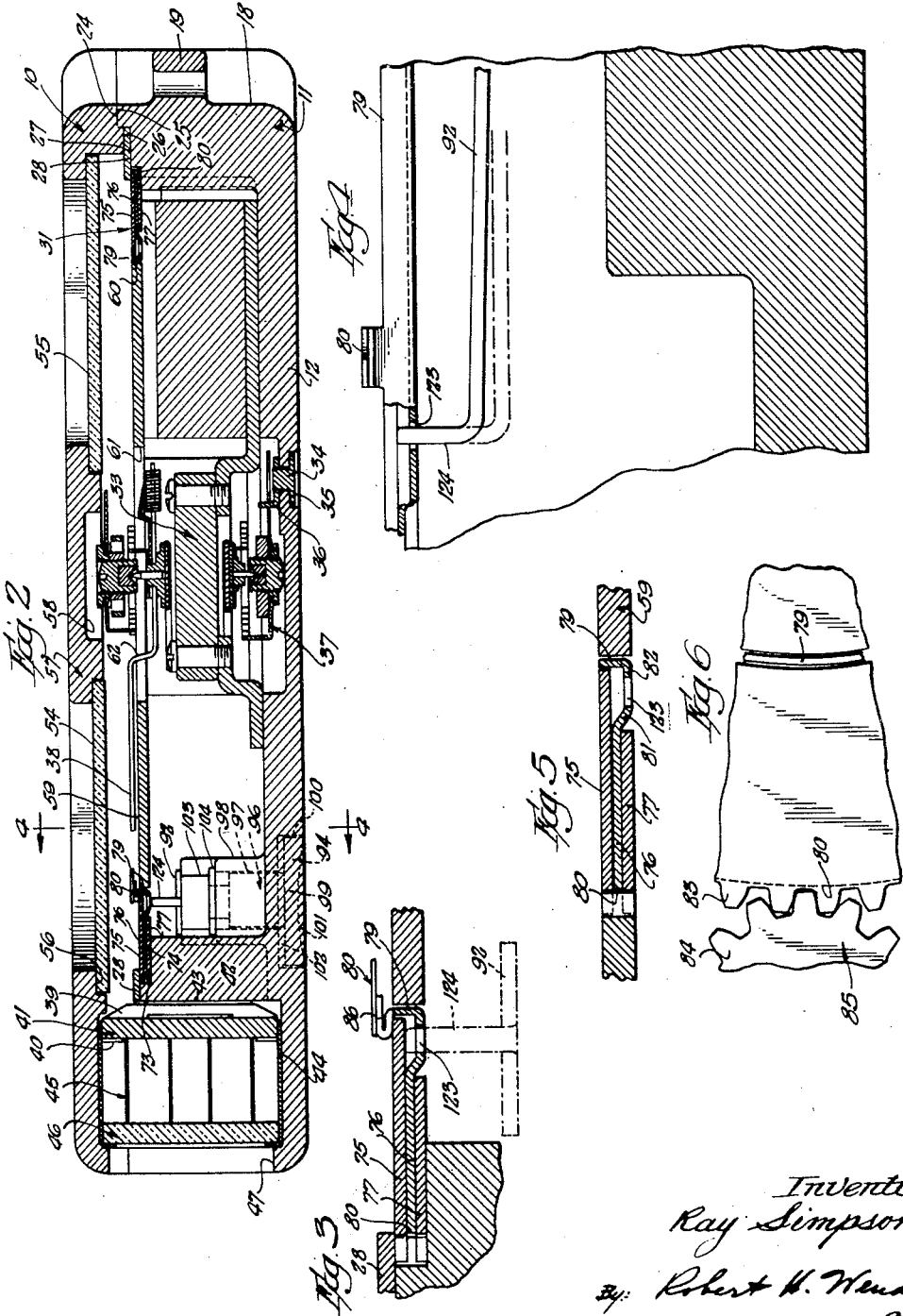
Inventor
Ray Simpson
By Robert H. Wendt
Atty Feb. 15, 1949.   R. SIMPSON   2,461,930
EXPOSURE METER HAVING COORDINATED METER
POINTER AND CALCULATING DISK
Filed April 26, 1946   4 Sheets-Sheet 3
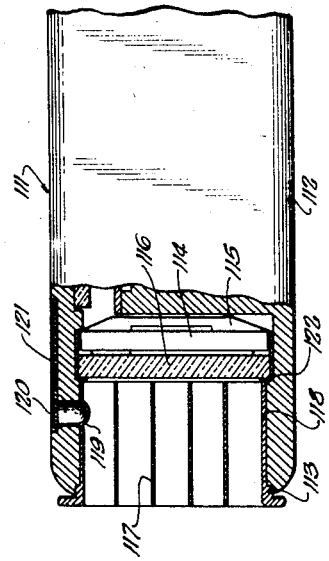
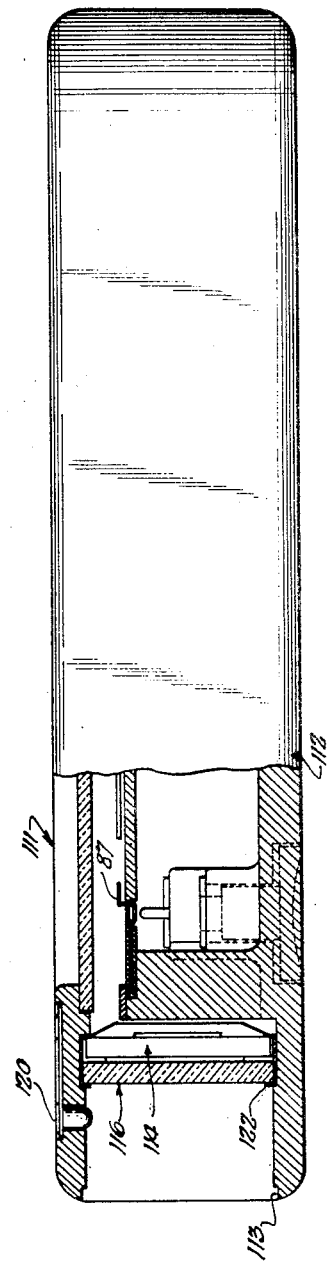
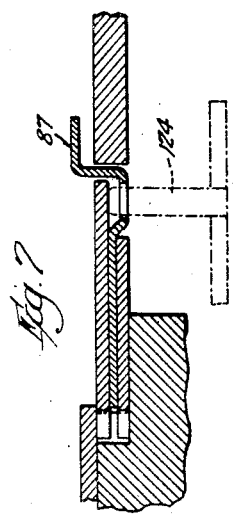
Inventor
Ray Simpson
By Robert H. Wendt
Atty.

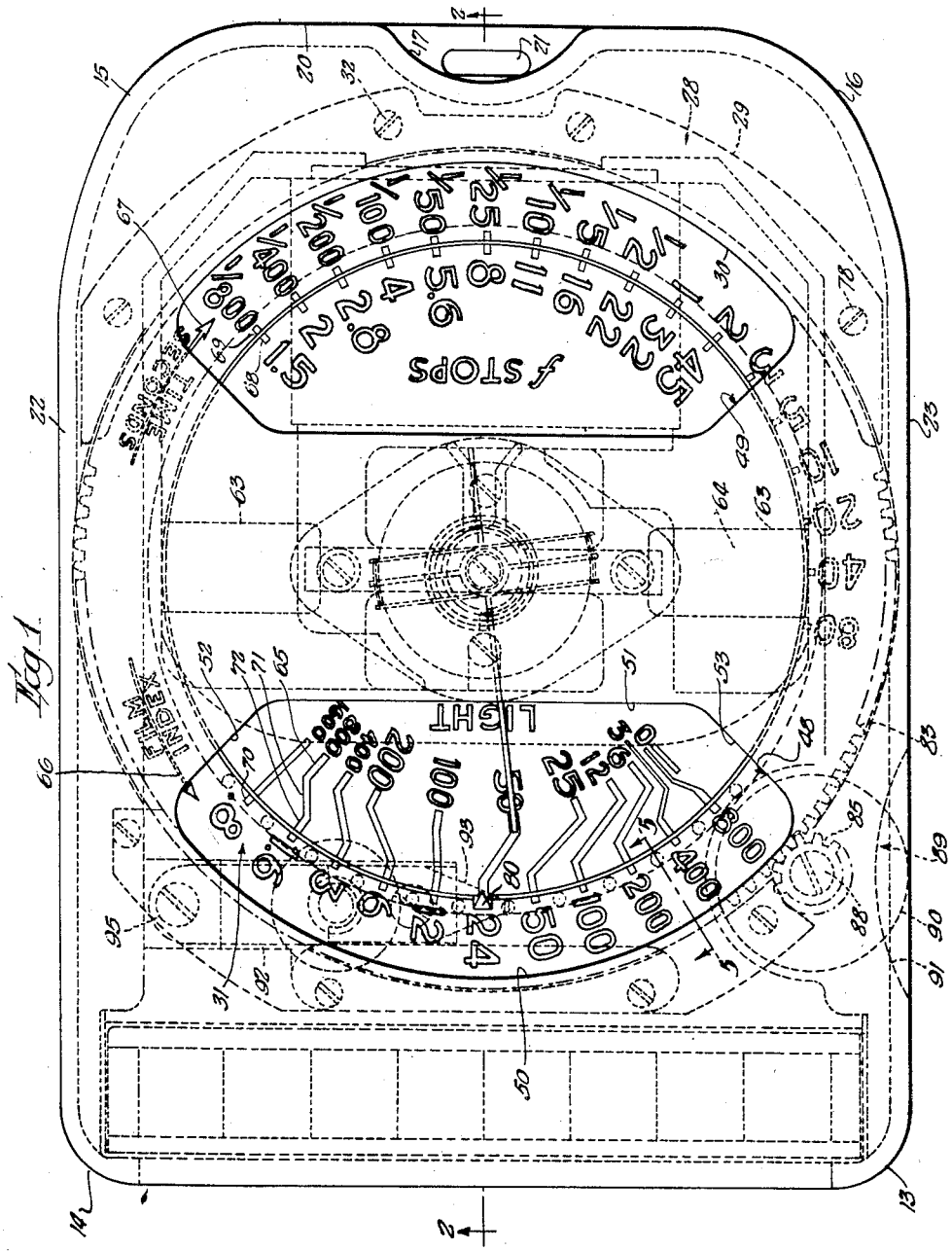

Feb. 15, 1949.   R. SIMPSON   2,461,930
EXPOSURE METER HAVING COORDINATED METER
POINTER AND CALCULATING DISK
Filed April 26, 1946   4 Sheets-Sheet 4
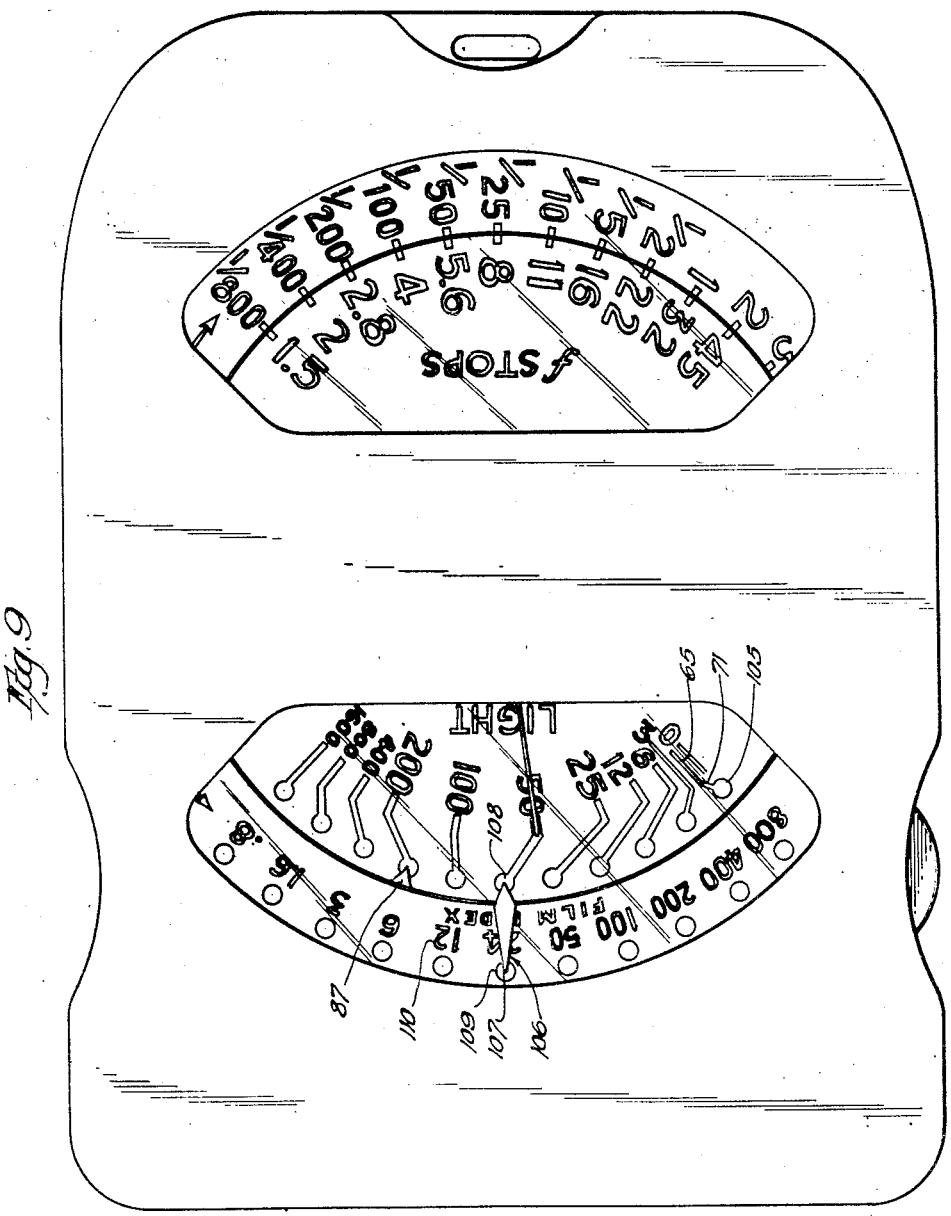
Inventor
Ray Simpson
by Robert H. Wendt
Atty.

Patented Feb. 15, 1949

2,461,930

UNITED STATES PATENT OFFICE 2,461,930

EXPOSURE METER HAVING COORDINATED METER POINTER AND CALCULATING DISK

Ray Simpson, River Forest, Ill., assignor to Simpson Electric Company, Chicago, Ill., a corporation of Illinois Application April 26, 1946, Serial No. 665,069

6 Claims. (Cl. 88—23)

1

The present invention relates to exposure meters, and is particularly concerned with instruments for measuring and automatically calculating the proper time for exposure of a photographic film of particular characteristics under certain light conditions for any of a number of different stop openings.

The exposure meters of the prior art are relatively large and unwieldly, and must therefore be carried in a separate case which can be carried by means of a handle or a shoulder strap, but due to their size the devices of the prior art cannot conveniently be carried in a pocket of the user.

One of the objects of the present invention is the provision of an improved exposure meter structure which is accurate, and which has a suitable range for measuring different light values, and which is so compactly constructed, and which has its parts so arranged, that the exposure meter may be carried in the vest pocket of the user.

In the exposure meters of the prior art a considerable amount of the space required for the device is taken up by the electrical movement, and one of the objects of the present invention is the provision of an improved electrical movement for an exposure meter which is so thin and small that it may be employed with other elements of an exposure meter to provide an extremely thin, flat and narrow exposure meter, capable of being conveniently carried in the pocket of the user, or it may be carried in the small auxiliary pockets which are provided in camera cases.

Another object of the invention is the provision of an improved exposure meter structure in which the calculator mechanism is located inside of the case of the exposure meter so that it may be operated by a gear mechanism having a drive wheel which is exposed at the side of the case and located in a recess so that all parts of the case may be made flush and smooth, with no protruding parts.

Another object of the invention is the provision of an improved housing and calculator structure for an exposure meter which is provided with suitable indicia and a pointer which may be set at the film speed so that this pointer may thereafter be used in connection with the pointer to secure a direct reading and to eliminate the possible error which might occur if the user had to refer to the film speed for every reading.

Another object of the invention is the provision

2 of an improved laminated calculator structure, one of the laminations being provided with a pointer or other indicator which is adapted to be pre-set to any desired film speed division, by locking the middle lamination with a locking mechanism and rotating the other laminations until this indicator is positioned at the desired film speed value. Thereafter, the indicator may be set in line with the light value indicated by the instrument pointer, by rotating all of the laminations together, and the proper time of exposure will be indicated at another part of the meter opposite the stop opening for such exposure time.

Another object of the invention is the provision of an extremely sensitive exposure meter which may have its lower range extended by removing the grid which is ordinarily used for limiting the light which reaches the light-responsive element, and which is provided with an auxiliary indicator calibrated and located at a different point on the scale so that when the grid is removed, lower light values may be read on the same meter and a suitable calculation made by the device for determining the proper time of exposure and stop.

Another object of the invention is the provision of an exposure meter which is simple in construction, sturdy, sensitive, accurate, and adapted to be manufactured at a low cost so that the devices may be sold at a price within the range of a vast number of purchasers.

Other objects and advantages of the invention will be apparent from the following description and the accompanying drawings, in which similar characters of reference indicate similar parts throughout the several views.

Referring to the drawings, of which there are three sheets,

Fig. 1 is a top plan view of an exposure meter embodying the invention, with various of the operative elements of the mechanism shown in dotted lines.

Fig. 2 is a side elevational view in partial section, on the plane of the line 2—2 of Fig. 1, looking in the direction of the arrows.

Fig. 3 is an enlarged fragmentary view of the laminated calculator structure taken on the same plane as Fig. 2.

Fig. 4 is a fragmentary sectional view taken on the plane of the line 4—4 of Fig. 2, looking in the direction of the arrows, and showing the structure of the latching mechanism by means of which the pointer lamination may be held while the others are moved in order to effect an adjustment of the pointer.

Fig. 5 is a fragmentary sectional view through the laminations of the calculator, taken on the plane of the line 5—5 of Fig. 1.

Fig. 6 is a fragmentary plan view showing the details of structure of the driving member by means of which the laminated circulator is rotated by the operator.

Fig. 7 is an enlarged fragmentary sectional view of a modified form of the exposure meter in which the calculator is provided with an auxiliary pointer for use in checking readings of extremely low light values which would not register with the grille in front of the light-sensitive element, but which will produce readings on the lower part of the scale when the grille has been removed and light is permitted to have access to the light-sensitive element without the interposition of the grille.

Fig. 8 is a view similar to Fig. 2, of a modification showing the arrangement of the instrument with the grille removed and as it should be when the special indicating pointer is used, which is located two stops beyond the usual pointer for greater sensitivity of the instrument on less light.

Fig. 9 is a view similar to Fig. 1, of a modification employing a different form and location of film index scale divisions and a different form of meter dial scale divisions, both of these being so widely spaced from each other that there is no direct cooperation between them.

Fig. 10 is a larger fragmentary sectional view of the exposure end of the meter showing the details of construction for this modification when a removable grille is employed.

As the present exposure meter is extremely thin and flat, and small enough to be placed in the vest pocket, the drawings show the parts of this device on an enlarged scale. The actual size of one embodiment of the invention is $3\frac{5}{32}$ inches long by $2\frac{1}{2}$ inches wide by $\frac{1}{4}$ inch thick.

Referring to Figs. 1 and 2, these are views which show the external shape of the housing, which is preferably made of two parts 10, 11, and which may be made of a suitable plastic, or molded out of a phenolic condensation compound. The housing 11 is provided with a flat rear wall 12 which is substantially rectangular in plan, but provided with rounded corners 13, 14 at the light-receiving end, and with the partially cylindrical larger curvature at the opposite portions 15, 16.

Intermediate the points 15 and 16 the housing member 11 may be formed with a partially cylindrical curved recess 17, 18 on either side of a centrally located rib 19, the rib having its edge flush with the edge 20 of the housing. The rib 19 is provided with an aperture 21, preferably in the form of a substantially rectangular slot rounded at each end, as shown in Fig. 1, so that it may receive a ribbon or strap or other securing device, by means of which the operator may make sure that the meter will never be dropped.

The edges 22, 23 of the housing member 11 are provided with a suitable side wall comprising an upwardly projecting rib 24, Fig. 2, which borders the three sides 20, 22 and 23 of the lower housing member 11. This rib is adapted to be received in a complementary rabbeted recess 25 in the upper housing member 10, which is also adapted to clamp in place, by means of its surface 26 against a surface 27 on the lower housing member 11, a suitable guide plate 28, which is adapted to guide the annular members of which the calculator is constructed.

Guide plate 28 is seen in dotted lines in Fig. 1, and it comprises an arcuate metal member, the outer edge 29 of which may take any convenient shape, but the inner edge 30 is preferably substantially circular and adapted to overhang the calculator mechanism which is indicated in its entirety by the numeral 31, as shown in Fig. 2.

Guide plate 28 may be secured in place by a plurality of through screw bolts 32 which are threaded into threaded bores in the surface 27 of the lower housing member. The side wall of the lower housing member 11 and the bottom wall 12 may be suitably thickened or recessed to house and support a suitable electrical instrument movement 33 which is preferably a D. C. milliameter movement of the moving coil type. This instrument is provided with a suitable spring zero adjustment in the form of a rotating stud 34 which is rotatably mounted in a socket 35 in the back wall, and which has an inwardly projecting eccentric pin 36 engaging between the forks of a spring supporting an adjusting member 37.

The details of the electrical movement need not be given here, as various types of electrical instruments may be employed, provided they are sufficiently compact to be housed in the space permitted.

The instrument movement 33 is provided with a pointer 38 which moves responsive to the current values passing through the instrument, and the terminals of the instrument are connected by suitable conductors to connectors or grids 39, 40 located on opposite sides of the light-responsive element 41.

Light impinging upon this element 41 produces an electromotive force between the opposite sides of the light-responsive element in the same manner as is well known in the prior art, and this electromotive force is impressed upon the coils of the moving coil of movement 33 to produce an indication of the strength of the light to which the meter is subjected.

The lower housing member 11 is preferably provided with a substantially flat end wall 42 behind the light sensitive element 41, the outer surface 43 of which may engage the spring 39 and place a suitable pressure upon light sensitive element 41 to urge it into electrical conducting engagement with the conductors, such as spring 39 and conductor 40, with which it is to engage.

On the outer side of the wall 42 the housing is provided with a recess 44 which may be rectangular in plan and elevation, and which is adapted to receive the grille 45 which limits the light reaching the light sensitive element 41 to that which is disposed forwardly of this element, and which does not permit light to reach this element by passing diagonally toward it, other than the small angular diversion permitted by the pockets of the grille.

The grille may be of any suitable construction, such as thin sheets of light metal running at right angles to each other and regularly spaced to form small square buttonholes, the sheets being oppositely slotted, after the manner of the fillers of an egg crate, and fitted together.

Grille 45 is engaged by the glass window 46 which, in turn, is held in place by borders of the housing at the window opening 47.

The upper housing member 10 may also consist of a suitably molded member, preferably made of insulation, such as a phenolic condensation compound, and this housing member is similar in shape, in plan, to the lower housing member upon which it fits.

The upper housing member 10 is preferably provided with a pair of window openings 48, 49, which are oppositely disposed, and which may be of any desired shape, provided they are large enough to expose the indicia of the calculator, as shown. Thus each window opening has a circular outer edge 50 and a flat inner edge 51.

The windows are also bordered at their ends by radial lines 52, 53. Each window is preferably closed by a pane of glass 54, 55, the glass being similar in shape to the openings 48, 49, but slightly larger, and the glass fitting in a rabbeted recess 56 which extends around the lower side of each of the apertures 48, 49.

The glass may be cemented in place, or may be secured by means of clips, not shown. This leaves the upper housing member 10 with a transversely extending bridging portion 57 going across the middle of the housing between the two windows 48, 49, and substantially covering the movement 33 of the electrical instrument. The bridging portion 57 has a centrally located recess 58 to provide clearance for the upper part of movement 33.

The two housing members may be secured together by means of a plurality of screw bolts having heads located to engage the upper housing, but also located flush with the surface in recesses or counterbores, and having their shanks threaded into the threaded bores of the lower housing.

The instrument movement 33 is provided with a dial plate 59 which is preferably circular in shape, as its outer edge 60 is adapted to serve as a guide for rotatably supporting the calculator mechanism, or, at least the disk extends into edge to edge relation with the calculator mechanism 31. This dial plate preferably has a centrally located circular aperture 61 which has a clearance with respect to the movement 33, and the pointer 38 is located on the movement below the dial plate 59 and has an offset 62 passing through the aperture 61 so that the pointer swings above the dial plate 59. The dial plate 59 may rest upon, and be secured to, a pair of inwardly extending lugs 63 carried by the bottom housing member 11, the upper surfaces 64 of these lugs being suitably located so as to support the dial plate 59 in substantially the same plane as the calculator mechanism 31.

Dial plate 59 is provided with indicia, such as the indicia ranging from 0 to 1600 in the upper window opening 48 which is located at the ends of the unequal scale division markings 65 which are arranged in alignment with the numbers of the indicia of the scale 0 to 1600. These indicia and scale divisions are indicative of the strength of the light impinging upon the light sensitive element.

Below the indicia 0 to 1600 the word "Light" preferably appears in bold letters on the dial plate below the window 48, while another suitable indicia, such as "f Stops," appears in the other window 49 on the dial plate above the indicia which appears in that window.

The outer housing also preferably is provided with indicia such as the curved arrow 66 pointing toward the indicia appearing on the calculator in the window 48, and the words "Film Index" appear in connection with the arrow 66 preferably upon the opposite sides of the arrow. This indicates to the user that the numbers 8 to 800, which appear on the top of the calculator mechanism 31 in the window 48 relate to the film speed factor to be used in calculating the proper timing and stop, depending upon the type of film which is used.

The upper housing also preferably has a second curved arrow 67 located adjacent the lower window 49 and bearing the legends "Time" and "Seconds," preferably with these words located on opposite sides of the arrow, the arrow pointing toward the indicia, which may range from 80 to 1/800 on the calculator mechanism 31 which is exposed in the lower window 49. Thus the attention of the operator is directed to the fact that the time in seconds may be read through this window on the calculator mechanism.

The dial plate also preferably supports indicia ranging from 1.5 to 45, relating to the f Stop openings for exposure along the edge of the dial plate through the lower window 49, and these stop indicia are located opposite the equal scale divisions 68 which appear on the lower edge of the dial plate adjacent the calculator mechanism.

The calculator mechanism is also provided with scale divisions 69 of equal spacing and of the same spacing as the scale divisions 68, these scale divisions 69 on the calculator being located opposite the indicia of time in seconds, which may range from 80 seconds to 1/800 of a second. Thus the stop scale divisions and indicia may be arranged to be located opposite the timing indicia and scale divisions so that when the calculator is properly adjusted the proper timing for any particular stop opening may be read through the opening 49.

The instrument movement 33 is so calibrated that when the calculator mechanism is moved to a position corresponding to the reading at the needle, the calculator will show the proper stop openings for the timing in seconds appearing opposite the stop openings.

As the timing scale divisions and stop scale divisions are arranged on an equal scale division basis, it is also necessary to have the film speed scale divisions equal, and, therefore, the indicia for film speed are shown opposite the equal scale divisions 70. In order to permit the user to correlate the proper film speed with the reading of the meter, in the use of the instrument, the unequal scale divisions 65 on the dial plate are preferably joined by means of guide lines 71 with a series of equal scale divisions 72 appearing on the edge of the dial plate immediately adjacent the scale divisions 70 which appear under the film speed indicia on the calculator mechanism 31. Thus the eye of the operator may immediately take the reading of the pointer and may follow the guide lines 71, such as, for example, that one reading from the reading 50 in the drawing outwardly to the scale division on the edge of the dial plate 59.

This scale division should be located opposite the film index, which corresponds to the film being used, which, in the present case, happens to be a factor of 24.

Referring again to Fig. 2, the lower housing half 11 is preferably formed with a cylindrical wall 73 and a plane supporting surface 74 located outwardly of the dial plate 59 and at such a level that the calculator mechanism 31 will have its upper surface flush with the dial plate 59.

Surfaces 73 and 74 provide a plane and a cylindrical guide surface for rotatably supporting the calculator mechanism 31, which is preferably constructed as follows:

The calculator mechanism preferably includes a plurality of laminations of thin metal which have been indicated by the numerals 75, 76, 77, beginning from the top downward. These laminations comprise thin annular metal members of sufficient size to be rotatably mounted within the cylindrical wall surface 73 on the plane surface 74 of the lower housing half 11, with a suitable clearance for rotation.

The annular laminations 75—77 are held in place by another pair of guide plates 28 of partially annular shape, as shown in dotted lines in Fig. 1. Guide plates 28 have been previously described as overhanging the calculator laminations at their inner edge 30, and these guide plates may be secured in place by means of a plurality of screw bolts 78 passing through the guide plates and threaded into threaded bores in the lower housing half 11.

The width of the uppermost annular lamination 75 is almost as great as the radial distance between the dial plate 59 and the outer cylindrical surface 73 by means of which the laminations are rotatably mounted. That is, the upper lamination 75 has sufficient clearance at its outer edge for rotation and sufficient clearance at its inner edge adjacent the dial plate 59 to pass the annular flange 79 which supports a pointer 80 and which is carried by the intermediate lamination 76.

The intermediate lamination 76 is preferably of slightly smaller diameter and of still thinner material than the two other laminations 75 and 77. Being of smaller diameter, its outer edge 80 (Fig. 2) is spaced inwardly of the annular wall 73 of the lower housing body 11. The two outer laminations 75 and 77 may thus be placed under a resilient pressure at this point by the guide plates 28 so that the central lamination 76 is resiliently and frictionally engaged between the other two laminations 75 and 77.

At its inner edge the central lamination 76 (Fig. 5) is formed with an offset portion 81 which extends into the plane of the third lamination 77 and with an annular rib 82 which is located substantially in the plane of the lamination 77. Annular rib 82 is provided with a multiplicity of irregularly spaced, circular apertures 123 adapted to be engaged by means of a latching pin 124 (Fig. 3) by means of which the middle lamination may be held still while the other laminations are rotated.

Annular rib 82 is bent upwardly at right angles, and carries an annular flange 79 which may be guided between the edge of the lamination 75 and the outer cylindrical edge of the dial plate 59.

The third lamination 77 is narrower than either of the other two laminations, and preferably extends from a point near the offset 81 of the middle lamination radially outward to the cylindrical guide wall 73 on the lower housing member 11.

Both of the laminations 75 and 77 are preferably provided with gear teeth 83 adapted to be engaged by the complementary teeth 84 located on a pinion 85, by means of which the calculator can be driven. Intermediate lamination 76 has its outer edge 80 located inwardly of the gear teeth 83 and 84 of cylindrical shape, so that it is not driven by the pinion 85, but can be driven through the intermediary of the two other laminations 75 and 77 which grip the intermediate lamination 76 frictionally.

The pointer 80 preferably comprises a separate small piece of sheet metal provided with an inwardly extending point, which piece is soldered or otherwise secured to an integral, radially extending flange 86 carried by the annular flange 79 on the intermediate lamination 76.

Flange 86 may be bent outwardly at right angles, as shown in Fig. 3, and then bent back, in substantially U-shape, on itself to provide a suitable support for the pointer 80 which is preferably made of some distinctive and highly visible color, such as white.

In addition to the pointer 80, the annular flange 79 also preferably supports a second pointer of distinctive color, such as the pointer 87, which may comprise an integral pointed lip on the annular flange 79, the lip being bent radially inward and parallel to the dial plate 59. The pointer 87 is located a space equal to two stops from the standard pointer 80 for a purpose further to be described, and it is preferably made of a different color, such as, for example, yellow.

The pointers 80 and 87, both being carried by the middle lamination 76, are always in the same relation to each other, but pointer 87 may be used for a different calibration of the instrument under conditions further to be described.

The pinion 85 may be carried by a shaft 88 which is rotatably mounted in the lower housing half 11 in such manner that the pinion is located outwardly of the laminations 75, 76 in position to mesh with the teeth 83. Shaft 88 also carries a thumb wheel 89 which has a knurled outer edge 90 and which is mounted in such position that it projects into a shallow, partially circular groove 91 formed in the side 23 of the lower housing half.

Groove 91 is considerably wider than the knurled edge 90 of the thumb wheel 89, but the thumb wheel itself preferably does not project beyond the plane surface of the wall 23 so that all parts of the instrument are arranged flush with or below these wall surfaces. Thus the operator may have access to the edge 90 of the thumb wheel 89 in the groove 91 so that he may rotate the thumb wheel, thereby rotating the shaft 88 and the pinion 85 to rotate the calculator mechanism 31. This permits the operator to adjust the calculator mechanism so that the film speed of the film which he is using is located opposite the indicia corresponding to the meter reading.

As previously stated, the middle lamination 76, with its pointers 80 and 87, may be held against rotation by the pin 124 while the other laminations 75 and 77 are being driven by means of the teeth 83 and pinion 85. Pin 124 may consist of the upwardly turned end of a leaf spring 92. This leaf spring is preferably an elongated resilient metal member which may be substantially rectangular in plan, as shown in Fig. 1, but has a tapered end portion 93 and a relatively thin, upwardly extending pin portion 124 at its extreme end.

The pin portion 124 preferably has its extreme end slightly rounded or tapered for easy insertion into the apertures 123 of the annular rib 82 of the intermediate lamination; and the pin 124 is so located radially of the axis of the instrument that it is in position to be engaged with any of a multiplicity of the apertures 123 in the intermediate lamination 76.

Spring 92 is biased into the non-engaging position, as shown in Fig. 2, and it does not engage any of the apertures 123 unless urged into this position by means of a push-button 94 which is located below an intermediate portion of the spring 92. Spring 92 has its end opposite to the pin 124 provided with an aperture for passing a screw bolt 95 by means of which that end of the spring is fixedly mounted on the lower housing half 11.

Push-button 94 may consist of a substantially cylindrical body 96 slidably mounted in a cylindrical bore 97 in a lug 98 which is formed inside the housing half 11 beneath the spring 92. Push-button 94 preferably has an enlarged head 99 located in a counterbore 100 on the bottom of the instrument, preferably flush with the bottom, and the head 99 may have a partially spherical depression 101 for engagement with a finger. Counterbore 100 is deeper than the thickness of head 99, providing a clearance space 102 into which the head 99 may be pushed, but the cylindrical end portion 103 of the push-button engages the under side of the spring 92 which urges the push-button 94 to the outer position shown in Fig. 2.

The push-button body preferably has a transverse pin 104 extending through its body and adapted to engage the end of the lug 98 to limit the outward motion of the head 99 so that the head will never project from the body of the housing. Thus the push-button 94 may be actuated to flex the spring 92 to cause the pin 124 to be inserted in any of the apertures 123 of the intermediate pointer bearing lamination 76.

The operation of this form of the device is as follows: Photographic films or plates are usually bought in quantity, and each film has a plurality of exposures. Therefore, it is the usual practice for an operator to use the same film speed a number of times in succession. Furthermore, it is often the habit of an operator to use the same kind of film continuously, in which case he would use the same film speed continuously, but operators often forget the numerical factor for the film speed which they are using.

In order to eliminate this uncertain factor of looking up the film speed on each occasion, or forgetting the film speed, or trying to set the instrument at the same film speed numerically, the present instrument is provided with the pointers 80 and 87 which may be set at the desired film speed, and which will thereafter indicate to the operator the point at which the calculator mechanism must be set in conformity with the meter reading. Pointer 80 is for all ordinary operations, while the pointer 87 is for a different calibration, as will be presently explained.

Suppose, for example, that the operator is using a film having a film speed of 24, and he has been previously using some other film speed. The operator then presses upon the button 94 while rotating the knurled thumb wheel 89. The rotation of the thumb wheel will drive the pinion 85, which may be driven in either direction, to rotate the calculator mechanism 31 by means of the teeth 83, 84 to the position desired.

If the operator is pressing upon the push-button 94, as soon as an opening 123 in the pointer bearing lamination 76 registers with the pin 124, the pin 124 will snap into an aperture 123, and pin 124 will hold the intermediate lamination 76 against rotation.

Due to the friction between the laminations, the thumb wheel 89 will then drive with some resistance, but it will, nevertheless, rotate the two other laminations 75 and 77, and the outer one of these, 75, bears all of the indicia of the calculator. The other laminations 75 and 77 may then be rotated while the pointer 80 is held still until the pointer is opposite the desired film speed, such as, for example, the film speed 24 shown in Fig. 2.

Then the operator may cease rotation of the calculator by means of the thumb wheel 89, and may release the push-button 94. If the calculator is then rotated without pressing the push-button, all of the laminations will rotate together, and the pointer 80 will rotate with the indicia 8 to 800 of the calculator. From now on, the pointer 80 is set at the film speed which the operator is customarily using, and no further thought need be given to the film speed number.

The use of the device is as follows:

When the open end 47 of the housing with the grille 45 is exposed to the lighting conditions, preferably at the same spacing from the subject at which the camera is to be spaced, a predetermined amount of light will impinge upon the light responsive element 41. This will cause a predetermined difference of potential between the inner and outer surfaces of the light responsive element, and the electromotive force thus generated will be conducted to the instrument movement through the suitable conductors and springs of the movement to the moving coil.

This will cause a deflection of the moving coil due to the reaction between the magnetic field of the permanent magnet and that of the energized moving coil, which will cause the pointer to move to a position depending upon the intensity of the light.

Suppose, for example, that the reading of the pointer is 50, as shown in Fig. 1. Then the operator should rotate the thumb wheel 90 until the pointer 80 is located opposite the scale division 24 on the dial plate which is connected by a diagonal line to the scale division for 50 of the meter reading. In making this setting of the calculator by means of the thumb wheel, the operator has moved the indicia for time in seconds of the calculator into a proper position opposite the stops, corresponding to the various times in seconds.

It is then only necessary for the operator to decide what kind of timing or what kind of stop is desired. This will depend upon the characteristics of the shutter of his camera, and upon the question whether he wishes to use a small stop opening for greater distinction or a relatively large stop opening with a shorter exposure and possibility of less sharp distinction, but more artistic effect.

Referring to Fig. 9, this is a front elevational view of an exposure meter embodying the invention and having a different type of indicia and scale division markings. It is not necessary, for the efficient operation of the device, that the equal scale divisions which are related to the meter reading of intensity of light cooperate with the scale divisions or indicia relating to film speed or film index when such a pointer is used which can be set at the film index desired.

Thus, in Fig. 9, the diagonally extending lines 71, which extend from the unequal scale divisions 65, may lead to a series of circular dots 105, equally spaced from each other on an arc and adapted to cooperate with a double-pointed white pointer 106.

This pointer 106 has an upper point 107 and a lower point 108. The upper point 107 may cooperate with another series of circular dots 109, and beneath which appear the indicia or numbers 110 corresponding to the film index. The lower point 108 of the pointer 106 cooperates with the series of dots 105.

The pointer 106 may be supported on a flange 80, as previously described, carried by the intermediate lamination, and may be set to any film index desired by the operator. Thereafter, the operator need not refer to the film index at all as long as he employs the same type of film, and thus it is only necessary to rotate the calculator mechanism until the lower point 108 is in alignment with the meter reading. This may be at any of the numerical indicia on the meter dial, or it may be a position in between the meter indicia, in which case the user should interpolate.

Referring now to the auxiliary pointer 87 which is to turn downwardly to cooperate with the scale divisions 105, this pointer is also carried by the intermediate lamination 76, but it is located two stops toward the right on the upper part of the calculator. This pointer is preferably made of a different color, such as a yellow pointer, and it is to be used when greater sensitivity is desired for lower readings of low light values, which would not give a good reading on the instrument as assembled in Figs. 1 and 2.

When this pointer is to be used, the front glass and the grille in front of the light sensitive element are removed, and instead of confining the light which reaches the light sensitive element to that which is located directly forward of the separate compartments of the grille, the removal of the grille permits light from all parts of the subject to be reflected against all parts of the light sensitive element. This causes a larger reading, but for this purpose the instrument requires a different calibration, and it is found that the same instrument may be used under these conditions, with the grille removed, if the film index pointer is moved two stops in a direction which requires longer exposure or a bigger stop.

Referring now to Fig. 10, this is a fragmentary elevational view of a modification of the open end of the housing, showing the construction which may be employed when a removable grille is to be used. In this case two housing halves 111, 112 may be similar in construction, except that at the open end there is no overhanging flange, but, on the contrary, the end of the housing is fully open and provided with a rabbeted recess 113 for receiving a complementary part of a grille. Here, again, the light responsive cell 114 is preferably engaged on its back by a spring 115 and on its front by suitable conductors which are interposed between the cell 114 and the glass 116.

The grille 117 is preferably in the form of a removable unit which may have around its periphery a separate housing 118 which is provided on one side with a retaining depression 119. This retaining depression may be engaged by a spring-pressed ball or catch 120 carried by the housing half 11 in the socket 121 for the grille 117 so that the grille may be pulled out, the catch 120 releasing it, or it may be pushed back into its socket, as desired, in which case the catch will hold it in place.

Suitable angle brackets or a rectangular bezel member 122 may be used for holding the glass 116 in place and for keeping a predetermined contact pressure between the conductors and the light responsive cell.

The modification of Fig. 10 has the advantage that it may be employed with the auxiliary pointer 87 for greater sensitivity of the exposure meter on less light, the instrument giving a reading which is more readily discernable and which extends over into the larger scale divisions away from the 0 indicia.

It will thus be observed that I have invented and improved exposure meter which may be made so thin and compact that it may be carried in the vest pocket of the user, and no carrying case need be employed.

All of the mechanical parts of the device are located inwardly of the outer surface of the housing or flush with it so that there are no protruding parts which will catch on the clothing or parts of the pocket of the user. The calculator mechanism is located inside the housing and operated by means of a gear mechanism having a knurled thumb wheel which is located in a recess.

The present device may have its index pointer set so that the operator need no longer try to remember or look up, for each occasion, the film index for the film which he habitually uses. This renders the operation of the calculator extremely simple, since it eliminates the necessity for first finding the desired film index, remembering it, and continuing to do this every time a light reading is taken.

The means for holding the pointer against rotation while the calculator is rotated permits the operator to set this pointer, as desired, and the provision of the extra pointer for use with the grille removed gives the device a greater sensitivity for readings on subjects which have but little illumination.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In an exposure meter, the combination of a molded insulating housing having rear walls, side walls and an end wall and open at its front side and at one end, said housing being formed with an annular recess bounded by a cylindrical surface and an adjacent plane surface at its open front side, a calculator assembly comprising an upper ring and a lower ring, the said rings being arranged one above the other for rotation in said recess, guide means carried by said housing for engaging the upper ring and holding the rings in said recess, driving means for rotating the upper and lower rings to adjust their rotative position, a dial plate located inside said rings in substantially the same plane, and having a central aperture, an electrical instrument movement located inside said central aperture and having a pointer passing through said aperture with its pointer end above said dial plate, said dial plate having a first portion of its face adjacent its periphery provided with scale divisions and with stop indicia, and having a second portion provided with scale divisions and light intensity indicia, the pointer end being located to move above the latter indicia, a first portion of the face of the upper ring being provided with scale divisions and time unit indicia for registry with the said stop indicia scale divisons on the dial plate, and the second portion of the face of said upper ring being provided with scale divisions and film index indicia, for registry with the light intensity scale divisions on the dial plate, and cover means for said housing for enclosing said exposure meter and including transparent parts for exposing said pointer and the parts of said rings and dial which bear indicia.

2. In an exposure meter, the combination of a molded insulating housing having rear walls, side walls and an end wall and open at its front side and at one end, said housing being formed with an annular recess bounded by a cylindrical surface and an adjacent plane surface at its open front side, a calculator assembly comprising an upper ring and a lower ring, the said rings being arranged one above the other for rotation in said recess, guide means carried by said housing for engaging the upper ring and holding the rings in said recess, driving means for rotating the upper and lower rings to adjust their rotative position, a dial plate located inside said rings in substantially the same plane, and having a central aperture, an electrical instrument movement located inside said central aperture and having a pointer passing through said aperture with its pointer end above said dial plate, said dial plate having a first portion of its face adjacent its periphery provided with scale divisions and with stop indicia, and having a second portion provided with scale divisions and light intensity indicia, the pointer end being located to move above the latter indicia, a first portion of the face of the upper ring being provided with scale divisions and time unit indicia for registry with the said stop indicia scale divisions on the dial plate, and the second portion of the face of said upper ring being provided with scale divisions and film index indicia, for registry with the light intensity scale divisions on the dial plate, a third intermediate ring located between said upper and lower rings and carrying a pointer located to register with the film index scale divisions, said intermediate ring being held by friction between said upper and lower rings, to indicate continuously the index of film being used, and cover means for said housing for enclosing said exposure meter and including transparent parts for exposing said pointer and the parts of said rings and dial which bear indicia.

3. In an exposure meter, the combination of a molded insulating housing having rear walls, side walls and an end wall and open at its front side and at one end, said housing being formed with an annular recess bounded by a cylindrical surface and an adjacent plane surface at its open front side, a calculator assembly comprising an upper ring and a lower ring, the said rings being arranged one above the other for rotation in said recess, guide means carried by said housing for engaging the upper ring and holding the rings in said recess, driving means for rotating the upper and lower rings to adjust their rotative position, a dial plate located inside said rings in substantially the same plane, and having a central aperture, an electrical instrument movement located inside said central aperture and having a pointer passing through said aperture with its pointer end above said dial plate, said dial plate having a first portion of its face adjacent its periphery provided with scale divisions and with stop indicia, and having a second portion provided with scale divisions and light intensity indica, the pointer end being located to move above the latter indicia, a first portion of the face of the upper ring being provided with scale divisions and time unit indicia for registry with the said stop indicia scale divisions on the dial plate, and the second portion of the face of said upper ring being provided with scale divisions and film index indicia, for registry with the light intensity scale divisions on the dial plate, said driving means comprising a thumb wheel rotatably mounted inside said housing with its edge exposed in a shallow recess, and gears connecting said thumb wheel with teeth carried by the edge of one of said rings, and cover means for said housing for enclosing said exposure meter and including transparent parts for exposing said pointer and the parts of said rings and dial which bear indicia.

4. In an exposure meter, the combination of a molded insulating housing having rear walls, side walls and an end wall and open at its front side and at one end, said housing being formed with an annular recess bounded by a cylindrical surface and an adjacent plane surface at its open front side, a calculator assembly comprising an upper ring and a lower ring, the said rings being arranged one above the other for rotation in said recess, guide means carried by said housing for engaging the upper ring and holding the rings in said recess, driving means for rotating the upper and lower rings to adjust their rotative position, a dial plate located inside said rings in substantially the same plane, and having a central aperture, an electrical instrument movement located inside said central aperture and having a pointer passing through said aperture with its pointer end above said dial plate, said dial plate having a first portion of its face adjacent its periphery provided with scale divisions and with stop indicia, and having a second portion provided with scale divisions and light intensity indicia, the pointer end being located to move above the latter indicia, a first portion of the face of the upper ring being provided with scale divisions and time unit indicia for registry with the said stop indicia scale divisions on the dial plate, and the second portion of the face of said upper ring being provided with scale divisions and film index indicia, for registry with the light intensity scale divisions on the dial plate, a third intermediate ring located between said upper and lower rings and carrying a pointer located to register with the film index scale divisions, said intermediate ring being held by friction between said upper and lower rings, to indicate continuously the index of film being used, and means for holding the intermediate ring against rotation while the upper and lower rings are rotated, to adjust the intermediate ring pointer to registry with the film index being used, and cover means for said housing for enclosing said exposure meter and including transparent parts for exposing said pointer and the parts of said rings and dial which bear indicia.

5. In an exposure meter, the combination of a molded insulating housing having rear walls, side walls and an end wall and open at its front side and at one end, said housing being formed with an annular recess bounded by a cylindrical surface and an adjacent plane surface at its open front side, a calculator assembly comprising an upper ring and a lower ring, the said rings being arranged one above the other for rotation in said recess, guide means carried by said housing for engaging the upper ring and holding the rings in said recess, driving means for rotating the upper and lower rings to adjust their rotative position, a dial plate located inside said rings in substantially the same plane, and having a central aperture, an electrical instrument movement located inside said central aperture and having a pointer passing through said aperture with its pointer end above said dial plate, said dial plate having a first portion of its face adjacent its periphery provided with scale divisions and with stop indicia, and having a second portion provided with scale divisions and light intensity indicia, the pointer end being located to move above the latter indicia, a first portion of the face of the upper ring being provided with scale divisions and time unit indicia for registry with the said stop indicia scale divisions on the dial plate, and the second portion of the face of said upper ring being provided with scale divisions and film index indicia, for registry with the light intensity scale divisions on the dial plate, a third intermediate ring located between said upper and lower rings and carrying a pointer located to register with the film index scale divisions, said intermediate ring being held by friction between said upper and lower rings, to indicate continuously the index of film being used, and means for holding the intermediate ring against rotation while the upper and lower rings are rotated, to adjust the intermediate ring pointer to registry with the film index being used, said latter means comprising a spring-pressed plunger having a head exposed in the rear wall of the housing and having a pin, insertable into an aperture in the intermediate ring, and cover means for said housing for enclosing said exposure meter and including transparent parts for exposing said pointer and the parts of said rings and dial which bear indicia.

6. In an exposure meter, the combination of a molded insulating housing having rear walls, side walls and an end wall and open at its front side and at one end, said housing being formed with an annular recess bounded by a cylindrical surface and an adjacent plane surface at its open front side, a calculator assembly comprising an upper ring and a lower ring, the said rings being arranged one above the other for rotation in said recess, guide means carried by said housing for engaging the upper ring and holding the rings in said recess, driving means for rotating the upper and lower rings to adjust their rotative position, a dial plate located inside said rings in substantially the same plane, and having a central aperture, an electrical instrument movement located inside said central aperture and having a pointer passing through said aperture with its pointer end above said dial plate, said dial plate having a first portion of its face adjacent its periphery provided with scale divisions and with stop indicia, and having a second portion provided with scale divisions and light intensity indicia, the pointer end being located to move above the latter indicia, a first portion of the face of the upper ring being provided with scale divisions and time unit indicia for registry with the said stop indicia scale divisions on the dial plate, and the second portion of the face of said upper ring being provided with scale divisions and film index indicia, for registry with the light intensity scale divisions on the dial plate, and a cover plate for said open side of said housing, said cover plate comprising a molded insulating member covering the electrical instrument movement and all parts of the inside of the housing except the pointer end, and the before-mentioned scale divisions and indicia which are exposed at two windows in said cover plate.

RAY SIMPSON.

REFERENCES CITED

The following references are of record in the file of this patent:

UNITED STATES PATENTS

| Number | Name | Date |
|---|---|---|
| 1,447,097 | Mella | Feb. 27, 1923 |
| 2,073,790 | Goodwin, Jr. | Mar. 16, 1937 |
| 2,105,255 | Mihalyi et al. | Jan. 11, 1938 |
| 2,117,429 | Kuppenbender | May 17, 1938 |
| 2,129,114 | Bernhard et al. | Sept. 6, 1938 |
| 2,147,999 | Tonnies | Feb. 21, 1939 |
| 2,209,156 | Fischer | July 23, 1940 |
| 2,227,166 | Tonnies | Dec. 31, 1940 |
| 2,241,020 | Nerwin | May 6, 1941 |
| 2,247,323 | Tonnies | June 24, 1941 |
| 2,245,522 | Bernhard et al. | June 10, 1941 |
| 2,274,441 | Williams | Feb. 24, 1942 |
| 2,275,344 | Bernhard et al. | Mar. 3, 1942 |
| 2,278,338 | Tonnies | Mar. 31, 1942 |